United States Patent
Pennington et al.

(10) Patent No.: US 8,370,929 B1
(45) Date of Patent: Feb. 5, 2013

(54) AUTOMATIC RESPONSE CULLING FOR WEB APPLICATION SECURITY SCAN SPIDERING PROCESS

(75) Inventors: William Pennington, San Jose, CA (US); Jeremiah Grossman, San Jose, CA (US); Robert Stone, Mountain View, CA (US); Siamak Pazirandeh, San Diego, CA (US)

(73) Assignee: WhiteHat Security, Inc., Santa Clara, CA (US)

( * ) Notice: Subject to any disclaimer, the term of this patent is extended or adjusted under 35 U.S.C. 154(b) by 1254 days.

(21) Appl. No.: 11/864,749

(22) Filed: Sep. 28, 2007

Related U.S. Application Data

(60) Provisional application No. 60/827,407, filed on Sep. 28, 2006.

(51) Int. Cl.
*G06F 11/00* (2006.01)
(52) U.S. Cl. ............... 726/22; 726/4; 726/25; 713/152; 713/187; 713/188; 713/189
(58) Field of Classification Search ............ 726/22
See application file for complete search history.

(56) References Cited

U.S. PATENT DOCUMENTS

2003/0233581 A1* 12/2003 Reshef et al. .......... 713/201
2005/0262063 A1* 11/2005 Conboy et al. .......... 707/3

OTHER PUBLICATIONS

Pandey et al. "WIC: A General Purpose Algorithm for Monitoring Web Information Sources", VLDB Conference, Canada 2004, pp. 360-371.*

* cited by examiner

*Primary Examiner* — Shewaye Gelagay
(74) *Attorney, Agent, or Firm* — Kilpatrick Townsend & Stockton LLP

(57) ABSTRACT

A method of testing a web application, wherein a web application is a program that operates on a server and interacts with clients that access the program over a network, wherein further the web application accepts parameters that define results generated from the web application, the method comprising determining which web application uniform resource identifiers (URIs) are used to access various web applications on a system, determining if more than a threshold of the URIs are for a common web application, selecting a subset of less than all of the URIs for the common web application when the threshold is exceeded for that common web application, wherein the subset is selected at least in part independently of the order generated and performing a security scan on the selected subset.

12 Claims, 4 Drawing Sheets

Selecting subset to scan

Original scan schedule

Scan subset (more skewed sampling)

Scan subset selected in same order as original scan schedule

Original scan schedule

Scan subset (more distributed sampling)

Scan subset not selected in same order as original scan schedule

AUTOMATIC RESPONSE CULLING FOR WEB APPLICATION SECURITY SCAN SPIDERING PROCESS

CROSS-REFERENCES TO RELATED APPLICATIONS

This application claims priority to U.S. Provisional Patent Application No. 60/827,407, entitled "Automatic Response Culling for Web Application Security Scan Spidering Process" filed Sep. 28, 2006, which is hereby incorporated in its entirety.

BACKGROUND OF THE INVENTION

The present invention relates network server security in general and in particular to web application security scanning.

There are a number of different configurations of network client-server interfaces available today, but the most common network in use is the Internet, a global internetwork of networks and networks that use Internet protocols and/or interfaces, such as extranets, intranets, local services, and other variations. In the general case, to which inventions described herein apply, clients connect to servers over the network and clients are not always trusted computers. As a result, the designers of the servers need to ensure that untrusted clients cannot perform malicious acts or access unauthorized portions of the server through the network.

One approach to ensure that servers cannot be accessed in an unauthorized manner is to only provide access to secured and trusted clients. However, in many situations, that is not possible. For example, if a merchant was running an on-line store, the merchant would want to allow most anyone who has a computer to access the servers providing the on-line store functionality, but do so in a way that still prevents unauthorized interactions with the servers.

Server security is more than just requiring a username and password from each client before responding to client requests, since even a logged in user might try for unauthorized access and a typical service provided by a server might include content and functionality for use by unauthenticated and unlogged-in clients. One approach to server security is to review all of the code that runs on the server and verify that it does not include statements that allow for unauthorized activity and review all the files present on the server and their respective permissions, side-effects, etc. While this might be practical for a small installation, say an FTP server that serves up predefined files to all comers, it is often not practical with complex, interactive applications that have many response modes.

One common use of servers in this environment, but not an exclusive use, is that of a web application. As used herein, "web" refers to a collection of documents/files, some of which have references, or links, to other documents/files in the collection. One example of a web is the World Wide Web ("WWW"), a collection of files served up by WWW servers (also called "web servers") using HTTP protocols or something similar. The "WWW" gets its name from the fact that most of these documents/files can be almost anywhere in the world and can be accessed anywhere in the world where there is Internet connectivity.

A web application is an application that runs on one or more server and provides some functionality or service in response to client requests received over a network using web protocols (i.e., HTTP, HTTPS, or something similar). An example of a web application is a database interface, wherein a database runs on a database system and clients can access data in that database system by sending a request for service over the network to a web application server. The web application server receives the request for service and decides, according to how it is programmed, what to do with the request. It can ignore the request, send an error message back to the client, or trigger an operation with the database system and respond to the client's request by sending the client the results of the database operation.

In a highly specific example, suppose a client computer system is operated by a customer seeking to configure and purchase a laptop computer. The customer would direct the client computer system to access a web application server operated by a vendor of laptop computers. The client computer system might send a request to the web application server via the network requesting a home page of the vendor. The web application server might respond with a home page that includes features allowing the client to interact with content on the home page (such as by selecting from available model names, features, etc.), send a subsequent request to the server, etc.

All the while, the web application server is making decisions about what is appropriate to send and what is not appropriate to send, based on its programming. For example, if the client computer sends a request for an updated page with updated pricing for new options selected by the customer, the web application server might perform some calculations, perform some database look-ups, generate a new dynamic web page and return that web page to the client computer in response to the request. However, if the client computer sends a request to see data about what someone else ordered, or internal data from the database server, the web application should properly refuse to respond to the request.

Because web applications are so complex, securing a web application and testing for security vulnerabilities, often involves an automated testing of the web application. Client-side web application testing refers to tests that are run from a client's point of view. For example, a client-side test suite might have logic for logging in to a web application, applying valid and invalid requests to the web application, noting the web application's responses and evaluating those responses. For example, if the test suite sends a request to the web application for ordering products where the prices have been altered and the response is "invalid order", the test suite might note that the web application is secure in that regard, but if the response is "thank you for your order", the test suite might note that the web application is not secure.

Once vulnerabilities have been identified, they can be brought to the attention of a web application designer for handling. Of course, if vulnerabilities are missed by the automated web application test suite, those vulnerabilities might never get fixed. Also, if there are too many false positives, the web application designer might give up on the test suite or miss some true positives. Furthermore, web application test suites need to perform their tests in reasonable amounts of time to be useful.

In view of the above, the inventions described herein provide improvements over existing approaches.

BRIEF SUMMARY OF THE INVENTION

Embodiments of the present invention provide a method of testing a web application, wherein a web application is a program that operates on a server and interacts with clients that access the program over a network, wherein further the web application accepts parameters that define results generated from the web application, the method comprising determining which web application uniform resource identifiers (URIs) are used to access various web applications on a system, determining if more than a threshold of the URIs are for a common web application, selecting a subset of less than all of the URIs for the common web application when the threshold is exceeded for that common web application, wherein the subset is selected at least in part independently of the order generated and performing a security scan on the selected subset.

The following detailed description together with the accompanying drawings will provide a better understanding of the nature and advantages of the present invention.

DETAILED DESCRIPTION OF THE INVENTION

An improved web application security scanner is described herein. A web application security scanner exercises a web application to find vulnerabilities and/or functional errors. For example a scanner might identify files on a web application server that are accessible but should not be, errors in web application logic, vulnerabilities wherein the web application accepts altered or unexpected inputs instead of responding with an error message.

The examples herein are not intended to be exhaustive, but describe embodiments of the present invention. Where individual items are shown, multiple items might be present, unless otherwise indicated. Where an indefinite number of items are shown or described, such as by parenthetical references to (1), (2), . . . , (n), the actual number is not limiting, unless otherwise specified. It should be noted that, unless otherwise indicated, the domain names used in the examples are not intended to refer to actual domains and any similarity is merely coincidental.

Figure 1:
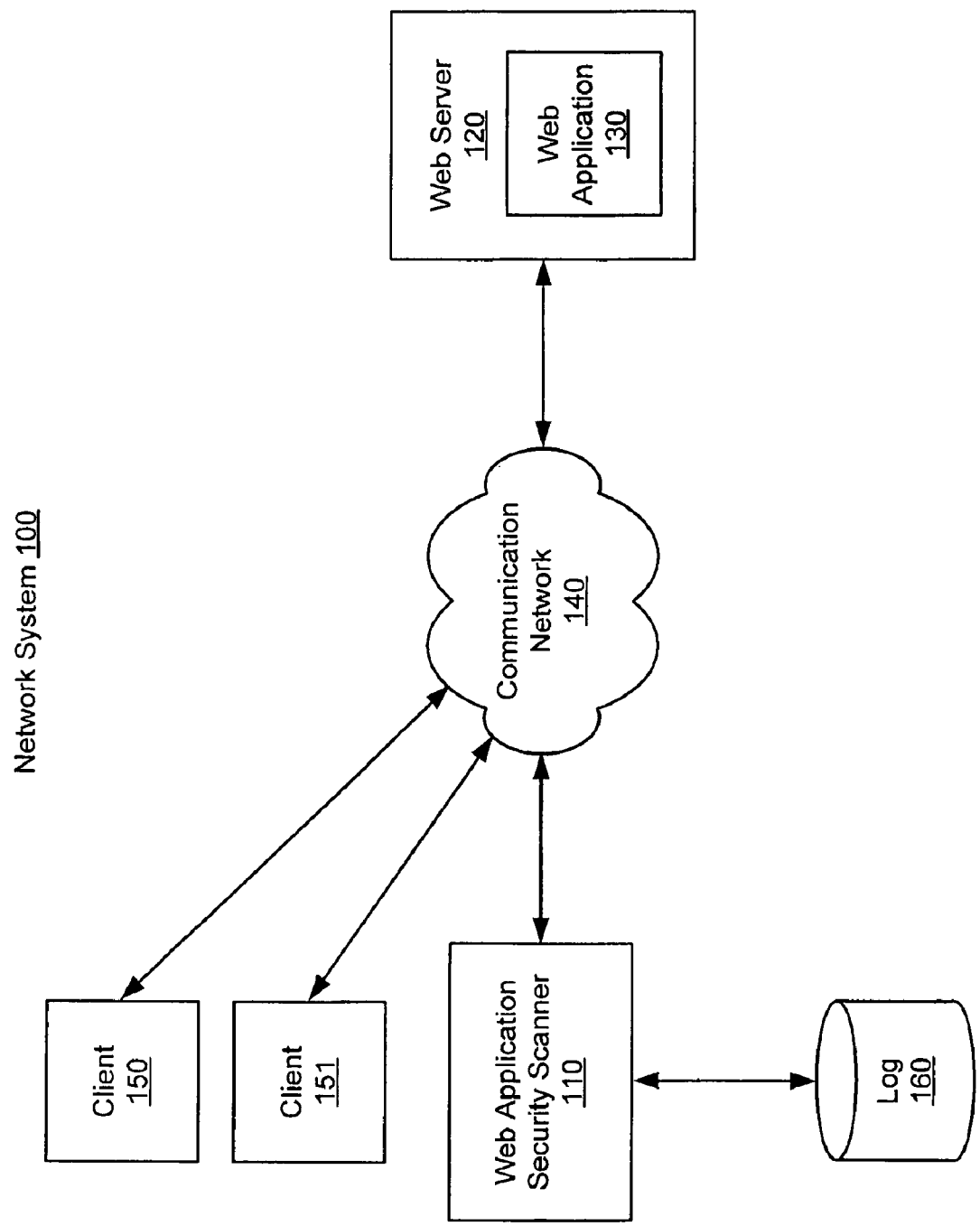
FIG. 1 is a high-level block diagram of a network employing a web application security scanner in accordance with embodiments of the invention.

FIG. 1 is a high-level block diagram of a network system 100 employing a web application security scanner 110. In one embodiment, as illustrated in FIG. 1, network system 100 includes web server 120 serving respective web application 130 to web application security scanner 110 via a communication network 140. Other users, such as client 150 and client 151 may be simultaneously served web application 130 by web server 102 via the same communication network 140. Communication network 140 may be any network, such as the Internet, a local area network (LAN), a wide area network (WAN), a wireless network, a wire-line network, etc. Web application security scanner 110 is also connected to a database 160 to log all activities and results.

A web application test suite, or "test suite", performs tests against a web application by sending client requests from a testing computer to the server running the web application and checking how the web application responds. The test suite might include a spidering function, wherein the test suite begins with one or more entry points to the web application, uses those entry points, analyzes the responses to find more entry points, then tests those entry points, etc., in effect "walking along the web" of entry points. Where the entry points are web pages, each entry point might have an associated Uniform Resource Identifier, or URI, that identifies the entry point. By sending a request to the server that includes a URI, the server might respond by returning the web page "pointed to" by that URI. The returned web page might include links in the form of URIs pointing to other web pages, and so on.

URIs can be dynamic, wherein the page referenced by the URI does not exist until a request is made. For example, suppose a vendor can supply 1000 products and has information about those 1000 products in a database. In response to a client computer sending a URI indicating one of those products, the web application can generate a page with information about that product from the database and send the generated page to the client computer. Where the generate page represents, say, an order form in progress, there might be trillions of possible variations for the page. In most cases, a test suite cannot generate URIs for all possible pages and make requests for all of those pages in a reasonable time. As a result, most web application testers need to rely on a sample test of all possible inputs.

Unattended website spidering gets examples of web site and web application usage to identify sample inputs and outputs of web applications. Where not all possible inputs can be run, the test suite should run a good, representative sample.

Many web applications will generate an unbounded or exceedingly large number of response pages because their inputs are not tightly bounded. A web based calendar for example may be happy to show a schedule all the way back to the year zero or even further into the past, and well into the next century and beyond. Of the approximately 800,000 days between 0 A.D. to 2200 A.D., there are probably less than 1% that are interesting and relevant to the user of this application, so a test suite should not test all 800,000 possible dates.

A spidering process for the purpose of web application testing can also benefit from spidering to a sampling of requests rather than every sampling in a complete set of requests. Once the spider has determined the ways this application can be called, and has a sample set of the kinds of output it produces, the value of further spidering diminishes.

Figure 2:
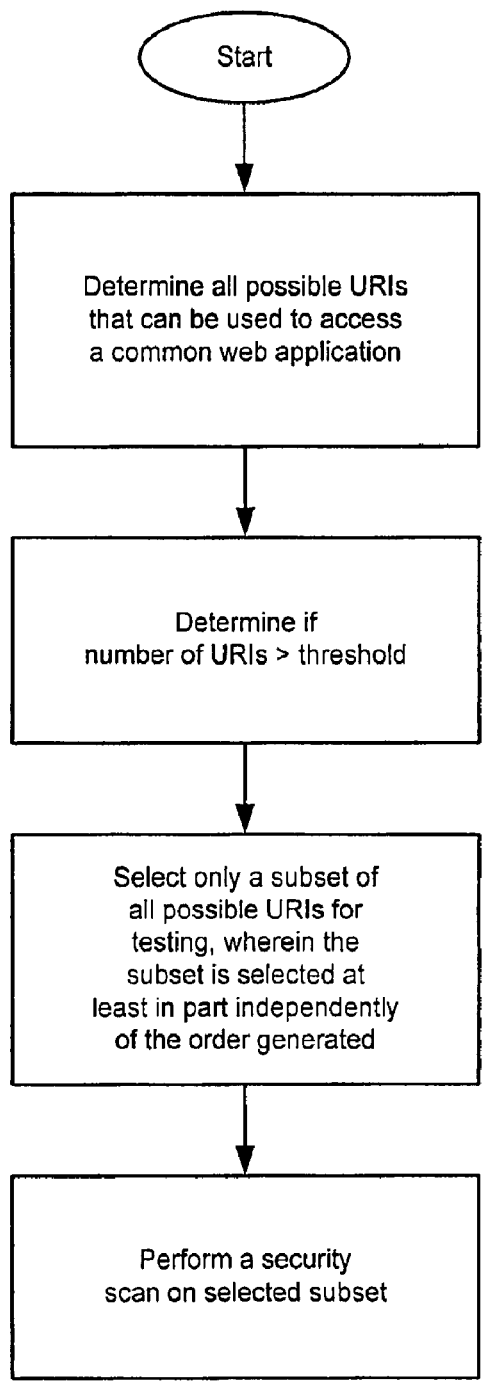
FIG. 2 is a flow diagram illustrating a method of providing for automatic response culling for web application security scan spidering process in accordance with embodiments of the invention.

FIG. 2 is a flow diagram illustrating how the above method of providing for automatic response culling for web application security scan spidering process may be implemented in accordance with embodiments of the invention.

Basic Implementation

In some embodiments, testing is performed by a test suite acting as a client and sending HTTP requests to a web application server and judging the responses. In an HTTP Request, the URI portion traditionally contains several segments with agreed upon meanings, for example in the URI "http://www.<somesite>.com/cgi-bin/calendar.cgi?year=1970&month=1&day=1"

the "http://www.<somesite>.com/cgi-bin/calendar.cgi" portion of the string is most likely interpreted as a selector for a specific web application. Everything after that string in the URI represents parameters to vary the output of the application. Where there are many valid possible combinations for the parameter values, the test suite can only be expected to run through and test a subset of all the possible values.

Figure 3:
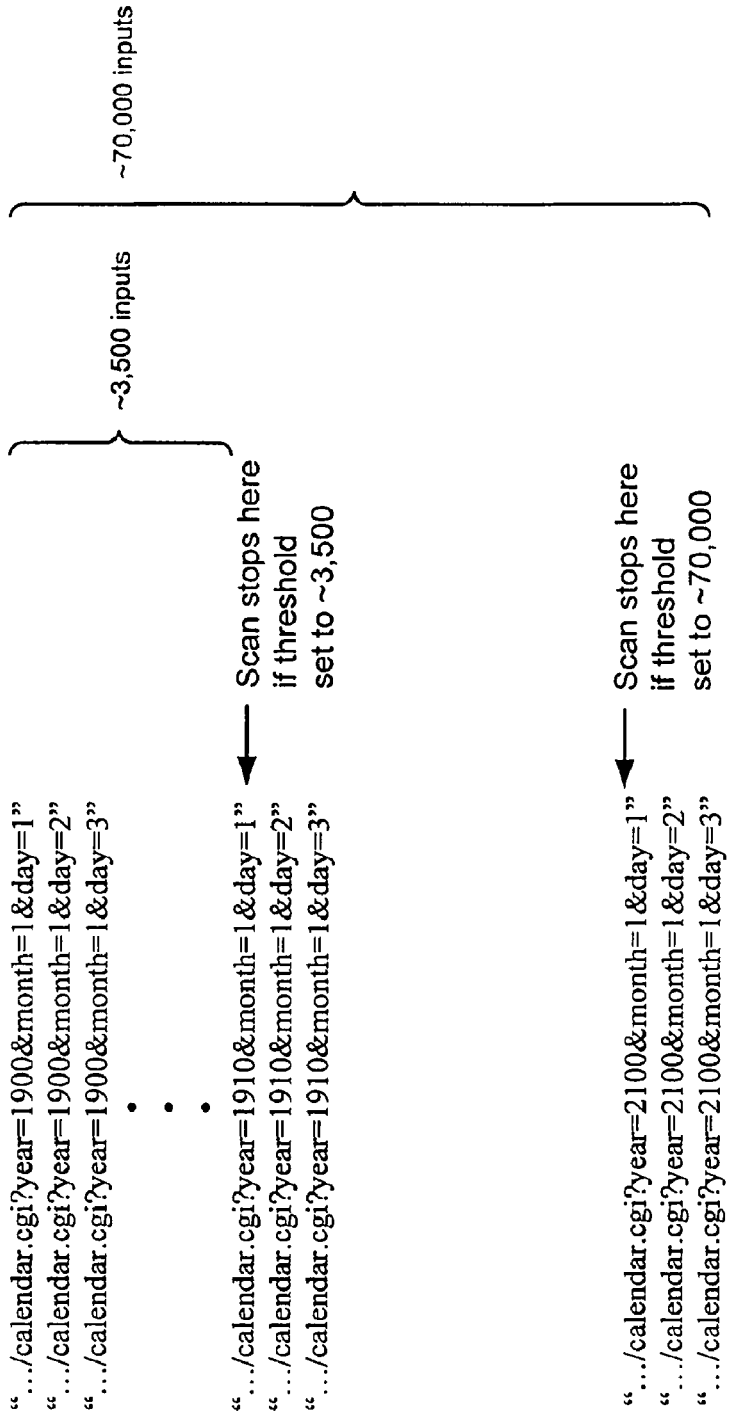
FIG. 3 is a diagram illustrating a method of sequentially generating a scan schedule for a specific web application with a calendar input functionality in accordance with embodiments of the invention.

One process for selecting a subset is to count how many requests refer to the URI http://www.<somesite>.com/cgi-bin/calendar.cgi during a spidering process and limit the number of URIs being considered to some threshold number. This would be somewhat problematic in cases where the sample set that the application presents to the spidering process is in a non-random order. FIG. 3 illustrates how a scan schedule might be sequentially generated for a specific web application with such a calendar input functionality. For example, if the threshold were set to check only 3500 dates and the application started with Jan. 1, 1900, no dates after 1910 would get checked. In order for the checking to continue up to Jan. 1, 2100, the threshold would have to be increased to a much higher value of 70,000 dates.

One approach to avoiding the skew that such an approach would incur is to randomly or semi-randomly skip some of the earlier samples in the presented sequence. As used herein, random, semi-random, etc., include truly random, pseudorandom and other categorizations that have essentially the same effect as random. In a specific implementation, a rate of skipping samples is determined according to an exponential decay function that controls which URIs referencing the same web application in the sequence are processed by the system. An example would be where the PDF of the decay function follows the formula $y=(½)**\text{floor}(x/32)$. Of course, other functions besides an exponential function could be used.

Figure 4:
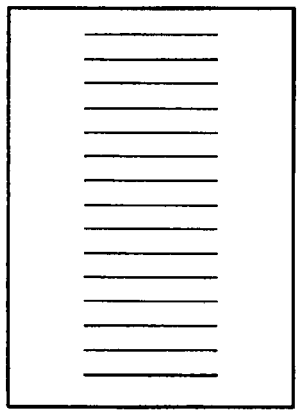
FIG. 4 is a diagram illustrating how selection of the scan subset through semi-random skipping would achieve a much more distributed sampling than if the selection of the scan subset was performed in the same order as the original scan list in accordance with embodiments of the invention.
Figure 4:
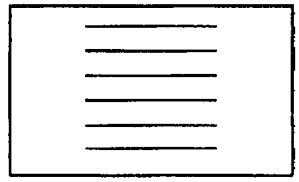
Figure 4:
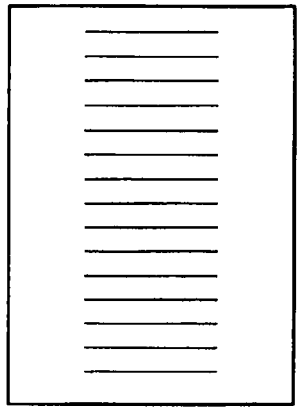
Figure 4:
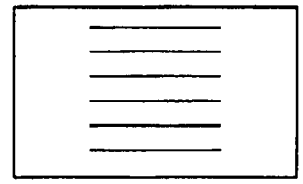

FIG. 4 is a diagram illustrating how selection of the subset through semi-random skipping would achieve a much more distributed sampling than if the selection of the subset was performed in the same order as the original scan list.

Alternative Implementation

In an HTTP Request, there are specific segments of the request that select which web application is to be called, and other portions that taken as parameters to that web application. A scanner according to embodiments presented here contains a profiler to identify which requests are calls to the same web application and what parameters are valid for each. After enough samples have been captured of a particular web application, the scanner might then choose to ignore any more examples discovered with increasing statistical likelihood.

One difference between the basic implementation and this alternative implementation is that the alternative provides a more flexible definition of how web applications are identified and allows for more powerful configuration of how references to web applications are selected as being excessive.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A method of testing a web application, wherein a web application is a program that operates on a server and interacts with clients that access the program over a network, the method comprising:

determining which web application uniform resource identifiers (URIs) are used to access each of a subset of web applications on a system, each web application being operable to accept parameters that define results generated from the web application;

determining, for each web application of the subset of web applications, if more than a threshold of the URIs are present for the web application;

selecting, for each web application of the subset of web applications, a subset of less than all of the URIs for the web application when the threshold is exceeded for that web application, wherein the subset of URIs is selected in a manner that is partly independent of an order generated; and using, for each web application of the subset of web applications, a test suite that executes electronic interactions with the web application to perform a security scan on the web application using the selected subset of URIs, the electronic interactions including the web application sending HTTP client requests to the web application and evaluating a response to identify vulnerabilities in the web application.

2. The method of claim 1, wherein the subset of URIs is selected in a manner that is partly random.

3. The method of claim 2, wherein determining which web application uniform resource identifiers (URIs) are used to access each of a subset of web applications comprises using a spidering process.

4. The method of claim 3, wherein the subset of URIs is selected using an exponential decay function.

5. A computing device for testing a web application, wherein a web application is a program that operates on a server and interacts with clients that access the program over a network, the computing device comprising:

a computer processor configured to read machine-readable instructions from a tangible, non-transitory computer-readable medium;

the machine-readable instructions comprising:

(a) program code for determining which web application uniform resource identifiers (URIs) are used to access each of a subset of web applications on a system, each web application being operable to accept parameters that define results generated from the web application;

(b) program code for determining, for each web application of the subset of web applications, if more than a threshold of the URIs present are for the web application;

(c) program code for selecting, for each web application of the subset of web applications, a subset of less than all of the URIs for the web application when the threshold is exceeded for that web application, wherein the subset of URIs is selected in a manner that is partly independent of an order generated; and (d) program code for performing, for each web application of the subset of web applications, a security scan on the selected subset of URIs, the security scan including sending HTTP client requests to web applications and evaluating responses to identify vulnerabilities in the web applications.

6. The computing device of claim 5, wherein the subset of URIs is selected in a manner that is partly random.

7. The computing device of claim 6, wherein determining which web application uniform resource identifiers (URIs) are used to access each of a subset of web applications comprises using a spidering process.

8. The computing device of claim 7, wherein the subset of URIs is selected using an exponential decay function.

9. A non-transitory computer-readable medium tangibly embodying a program of machine-readable instructions executable by a digital processing apparatus having stored thereon instructions configured to test a web application, the computer-readable medium being electronically readable, comprising:

program code for determining which web application uniform resource identifiers (URIs) are used to access each of a subset of web applications on a system, each web application being operable to accept parameters that define results generated from the web application;

program code for determining, for each web application of the subset of web applications, if more than a threshold of the URIs present are for the web application;

program code for selecting, for each web application of the subset of web applications, a subset of less than all of the URIs for the web application when the threshold is exceeded for that web application, wherein the subset of URIs is selected in a manner that is partly independent of an order generated; and program code for performing, for each web application of the subset of web applications, a security scan on the selected subset of URIs, the security scan including sending HTTP client requests to web applications and evaluating responses to identify vulnerabilities in the web applications.

10. The computer-readable medium of claim 9, wherein the subset of URIs is selected in a manner that is partly random.

11. The computer-readable medium of claim 10, wherein determining which web application uniform resource identifiers (URIs) are used to access each of a subset of web applications comprises using a spidering process.

12. The computer-readable medium of claim 11, wherein the subset of URIs is selected using an exponential decay function.

* * * * *